(12) United States Patent
Selvamanickam et al.

(10) Patent No.: US 12,412,681 B2
(45) Date of Patent: *Sep. 9, 2025

(54) HYBRID ROUND SUPERCONDUCTOR WIRES USING NB—TI FILAMENTS

(71) Applicants: University of Houston System, Houston, TX (US); AMPeers LLC, Houston, TX (US)

(72) Inventors: Venkat Selvamanickam, Houston, TX (US); Soumen Kar, Houston, TX (US)

( * ) Notice: Subject to any disclaimer, the term of this patent is extended or adjusted under 35 U.S.C. 154(b) by 282 days.

This patent is subject to a terminal disclaimer.

(21) Appl. No.: 17/801,984

(22) PCT Filed: Dec. 23, 2020

(86) PCT No.: PCT/US2020/066760
§ 371 (c)(1),
(2) Date: Aug. 24, 2022

(87) PCT Pub. No.: WO2021/173216
PCT Pub. Date: Sep. 2, 2021

(65) Prior Publication Data
US 2023/0099529 A1     Mar. 30, 2023

Related U.S. Application Data (60) Provisional application No. 62/980,762, filed on Feb. 24, 2020.

(51) Int. Cl.
| H01B 12/06 | (2006.01) |
| H01B 12/08 | (2006.01) |
| H01B 13/00 | (2006.01) |

(52) U.S. Cl.
CPC ............ *H01B 12/06* (2013.01); *H01B 12/08* (2013.01); *H01B 13/0036* (2013.01)

(58) Field of Classification Search
None
See application file for complete search history.

(56) References Cited

U.S. PATENT DOCUMENTS

| 3,173,079 A | * | 3/1965 | McFee | ............... H01B 12/02 336/200 |
| 4,277,705 A | * | 7/1981 | Rios | ............... H02K 9/20 310/215 |

(Continued)

FOREIGN PATENT DOCUMENTS

| DE | 102010040272 A1 | * | 3/2012 | ........... H01F 41/048 |
| EP | 0463568 A2 | | 1/1992 | |

(Continued)

OTHER PUBLICATIONS

Original and Translation of CN113718313 (Year: 2021).*

(Continued)

*Primary Examiner* — Timothy J. Dole
*Assistant Examiner* — Muhammed Azam
(74) *Attorney, Agent, or Firm* — Blank Rome LLP (57) ABSTRACT

A round superconductor wire, method for fabricating same, and method for detecting quench in the same are disclosed. A round superconductor wire includes a superconductor wire former and at least one superconductor tape wound on the superconductor wire former. Each superconductor tape includes a substrate, a buffer film stack overlying the substrate, and a superconductor film overlying the buffer film stack.

20 Claims, 6 Drawing Sheets

(56) References Cited

U.S. PATENT DOCUMENTS

| | | | | |
|---|---|---|---|---|
| 4,711,825 | A * | 12/1987 | Oberly | H01B 1/023 428/614 |
| 5,532,664 | A * | 7/1996 | Buckles | H01F 6/06 336/DIG. 1 |
| 6,591,120 | B1 * | 7/2003 | Tanaka | H10N 60/203 505/231 |
| 6,750,399 | B1 | 6/2004 | Daeumling | |
| 7,774,035 | B2 * | 8/2010 | Lee | H10N 60/203 505/231 |
| 8,032,196 | B2 * | 10/2011 | Wakana | H10N 60/0941 505/190 |
| 8,283,816 | B2 * | 10/2012 | Ohashi | H02K 55/02 310/52 |
| 8,385,994 | B2 * | 2/2013 | Kodama | G01R 33/3815 505/231 |
| 8,442,605 | B2 * | 5/2013 | Willen | H01B 12/16 505/230 |
| 8,644,897 | B2 * | 2/2014 | Ichiki | H10N 60/80 505/220 |
| 8,716,188 | B2 * | 5/2014 | Xie | H10N 60/203 29/599 |
| 8,745,851 | B2 * | 6/2014 | Wang | H10N 60/80 505/925 |
| 8,802,598 | B2 * | 8/2014 | Usoskin | H10N 60/30 505/238 |
| 8,809,236 | B2 * | 8/2014 | Oswald | H10N 60/0801 427/63 |
| 8,809,685 | B2 * | 8/2014 | Bianchetti | H01R 4/68 29/599 |
| 8,983,563 | B2 * | 3/2015 | Semerad | H01B 12/02 505/238 |
| 9,691,532 | B2 * | 6/2017 | Tosaka | H01F 6/065 |
| 9,741,472 | B2 * | 8/2017 | Kumakura | H01F 6/06 |
| 10,128,025 | B2 * | 11/2018 | Kurihara | H10N 60/0801 |
| 10,453,590 | B2 * | 10/2019 | Selvamanickam | H01B 12/06 |
| 10,607,753 | B2 * | 3/2020 | Selvamanickam | H10N 60/0828 |
| 10,818,416 | B2 * | 10/2020 | Selvamanickam | H01B 1/02 |
| 10,916,361 | B2 * | 2/2021 | Hayashi | H10N 60/0324 |
| 11,289,640 | B2 * | 3/2022 | Solovyov | H10N 60/0801 |
| 11,393,970 | B2 * | 7/2022 | Majkic | H10N 60/0464 |
| 11,653,575 | B2 * | 5/2023 | Schlenga | H10N 60/0128 505/231 |
| 12,050,139 | B2 * | 7/2024 | Takayasu | G01K 13/006 |
| 2002/0134574 | A1 | 9/2002 | Hughey et al. | |
| 2016/0217890 | A1 | 7/2016 | Kurokawa et al. | |
| 2016/0260526 | A1 * | 9/2016 | Otto | H01B 13/0016 |
| 2018/0151792 | A1 | 5/2018 | Selvamanickam | |
| 2018/0158577 | A1 * | 6/2018 | Xu | B22F 7/04 |
| 2021/0358660 | A1 * | 11/2021 | Majkic | H01B 12/06 |
| 2023/0008754 | A1 * | 1/2023 | Tanaka | H10N 60/81 |
| 2023/0099529 | A1 * | 3/2023 | Selvamanickam | H01B 13/0036 174/125.1 |
| 2023/0274858 | A1 * | 8/2023 | Kadiyala | H01B 12/06 505/230 |
| 2025/0079047 | A1 * | 3/2025 | Hartwig | H01B 13/0006 |

FOREIGN PATENT DOCUMENTS

| | | | | |
|---|---|---|---|---|
| EP | 2835838 | A1 * | 2/2015 | H01L 39/02 |
| GB | 1576416 | A * | 10/1980 | H01B 12/10 |
| JP | H0574235 | A * | 3/1993 | |
| JP | H05182534 | A * | 7/1993 | |
| JP | H06150736 | A * | 5/1994 | |
| JP | H06196028 | A * | 7/1994 | |
| JP | H06267344 | A * | 9/1994 | |
| JP | H0714442 | A * | 1/1995 | |
| JP | H0785735 | A * | 3/1995 | |
| JP | H08315649 | A * | 11/1996 | |
| JP | 2749136 | B2 * | 5/1998 | |
| JP | 2007273139 | A * | 10/2007 | |
| JP | 2008192352 | A * | 8/2008 | |
| JP | 2009231201 | A * | 10/2009 | |
| JP | 5274895 | B2 * | 8/2013 | |
| JP | 2014034688 | A * | 2/2014 | |
| JP | 2018163738 | A * | 10/2018 | |
| KR | 100821209 | B1 * | 4/2008 | |
| KR | 20150021875 | A * | 3/2015 | |
| WO | WO-2005096322 | A1 * | 10/2005 | H01F 6/06 |
| WO | WO-2006035065 | A2 * | 4/2006 | H01F 41/048 |
| WO | WO-2008007141 | A1 * | 1/2008 | H01B 12/06 |
| WO | WO-2008044500 | A1 * | 4/2008 | B21C 3/04 |
| WO | WO-2008048331 | A2 * | 4/2008 | C23C 16/408 |
| WO | WO-2017047959 | A1 * | 3/2017 | H01B 12/02 |
| WO | 2020087069 | A2 | 4/2020 | |

OTHER PUBLICATIONS

Original and Translation of JP2000195349 (Year: 2000).*
Original and Translation of JP2006185861 (Year: 2006).*
Extended European Search Report issued Feb. 16, 2024 in counterpart European Patent Application No. 20921408.9 (11 pages).
Kar, Soumen et al. "Symmetric tape round REBCO wire with J e (4.2K, 15 T) beyond 450 A mm-2 at 15 mm bend radius: a viable candidate for future compact accelerator magnet application." Superconductor Science and Technology, vol. 31, No. 4, Apr. 1, 2018.
Kar, Soumen et al. "Next-generation highly flexible round REBCO STAR wires with over 580 A mm-2 at 4.2 K, 20 T for future compact magnets." Supercond. Sci. Technol. vol. 32 (Aug. 20, 2019) 10LT01. 7 pages. https://doi.org/10.1088/1361-6668-ab3904.
Shen, T. et al. "Stable, predictable and training-free operation of superconducting Bi-2212 Rutherford cable racetrack coils at the wire current density of 1000A/mm2." Scientific Reports, vol. 9, Jul. 15, 2019, pp. 1-9. https://www.nature.com/articles/S41598-019-46629-3.pdf.
International Search report mailed May 5, 2020 in counterpart International Application No. PCT/US2019/058355.
International Search report mailed Mar. 15, 2021 in counterpart International Application No. PCT/US2020/066760.
Barth, Christian. "Overview: HTS4F Fusion Workshop." Universite de Geneve, Jan. 27, 2014, pp. 1-24.
Van der Laan, D.C. "YBa2Cu3O7-δ coated conductor cabling for low ac-loss and high-field magnet applications." Supercond. Sci. Technol. 22(2009) 065013 pp. 1-5.
Selvamanickam, V. et al. "High Performance 2G Wires: From R&D to Pilot-Scale Manufacturing." IEEE Transactions on Applied Superconductivity, vol. 19, No. 3, Jun. 2009. pp. 3225-3230.
Takayasu, M. et al. "Present Status and Recent Developments of the Twisted Stacked-Tape Cable Conductor." IEEE Transactions on Applied Superconductivity. vol. 26, No. 2, Mar. 2016. 10 pages.
Luo, W. et al. "Fabrication and Electromagnetic Characterization of Ultrasmall Diameter REBCO Wires." IEEE Transactions on Applied Superconductivity. vol. 27, No. Jun. 4, 2017. 5 pages.
Mulder, T. et al. "Development of REBCO-CORC Wires With Current Densities of 400-600 A/mm2 at 10 T and 4.2 K." IEEE Transactions on Applied Superconductivity. vol. 28, No. 3, Mar. 2018. 4 pages.
Fleiter, J. et al. "Electrical characterization of REBCO Reobel cables." 2013 Supercond. Sci. Technol. 26, 065014 doi:10.1088/0953-2048/26/6/065014. 5 pages.
Kar, S. et al. "Ultra-Small Diameter Round REBCO Wire With Robust Mechanical Properties." IEEE Transactions on Applied Superconductivity. vol. 27, No. Jun. 4, 2017. 4 pages.
Luo, W. et al. "Superior critical current of Symmetric Tape Round (STAR) REBCO wires in ulta-high background fields up to 31.2 T." 2018 Supercond. Sci. Technol. 31 12LT01, 8 pages.
Majkic, G. et al. "Engineering current density over 5 kA mm-2 at 4.2 K, 14 T in thick film REBCO tapes." 2018 Supercond. Sci. Technol. 31 10LT01, 8 pages. DOI: 10.1088/1361-6668/aad844.
Van der Laan, D.C. et al. "Record current density of 344 A mm-2 at 4.2 K and 17 T in CORC® accelerator magnet cables." 2016 Supercond. Sci. Techno. 29 055009. doi: 10.1088/0953-2048/29/5/055009. 9 pages.
Takayasu, M. et al. "Development of REBCO Twisted Stacked-Tape Cables for Magnet Application." May 21-23, 2014, 1st Workshop on (56) References Cited

OTHER PUBLICATIONS

Accelerator Magnets in HTS and DESY, Hamburg, Germany. 27 pages. https://indico.cern.ch/event/308828/contributions/1680713/attachments/589814/811821/WAMHTS-1_Takayasu.pdf.

* cited by examiner

FIG. 1A

| Top Stabilizer Layer |
| Top Ag Layer |
| Superconductor Film |
| Buffer Film Stack |
| Substrate |
| Bottom Ag Layer |
| Bottom Stabilizer Layer |

HYBRID ROUND SUPERCONDUCTOR WIRES USING NB—TI FILAMENTS

CROSS REFERENCE TO RELATED APPLICATION(S)

This application is a 371 application of PCT/US2020/066760, filed on Dec. 23, 2020, which claims priority to U.S. provisional patent application No. 62/980,762, filed on Feb. 24, 2020, both of which are hereby incorporated herein by reference in their entireties.

GOVERNMENT SPONSORSHIP

This invention was made with government support under DE-SC0018850 awarded by U.S. Department of Energy—Small Business Innovation Research (SBIR). The Government has certain rights in the invention.

FIELD

The embodiments disclosed herein are in the field of superconductors. More particularly, the embodiments disclosed herein relate to round superconductor wires and methods for fabricating same, which, inter alia, achieve a round superconductor wire having improved engineering current density ($J_e$) in high magnetic field applications when made in small diameters, and which may serve as a mechanism for quench detection.

BACKGROUND

A promising high temperature superconductor (HTS) candidate for use in accelerator magnets is RE-Ba—Cu—O (REBCO, RE=rare earth) tape that is fabricated by a reel-to-reel thin film process. Two challenges with REBCO tape as compared to Nb—Ti, $Nb_3Sn$, and Bi-2212 wires are associated with their overall flat rather than round cross-sectional geometry and a wide (~12 mm) profile rather than a multifilamentary architecture. To address these issues, globally, there have been efforts on high-current multi-strand REBCO cable configurations for accelerator applications such as ROEBEL cables in a rectangular structure, twisted stacked tape cables, and conductor-on-round-core (CORC®) cables/wires. On the other hand, current round RE-Ba—Cu—O (REBCO, RE=rare earth) superconductor wires are limited in engineering current density ($J_e$) levels of about 400 $A/mm^2$ at 20 T when made in diameters less than 2 mm. Problems in degradation of high-performance REBCO tapes when wound to such small diameters are limiting the $J_e$ levels of the round wires.

Therefore, there is a need to achieve increases in the $J_e$ of round REBCO wires to substantially higher levels of about 1000 $A/mm^2$ at 20 T when wound to diameters less than 2 mm.

Further, superconductor Symmetric Tape Round (STAR) wires made of REBCO tapes are limited in their $J_e$ by the copper wire former which occupies about 20-30% of the STAR wire cross-section. Since there is a lower limit for the diameter of the former on which the REBCO tapes can be wound to avoid deterioration of performance, small diameter STAR wires can consist of only a few REBCO tapes which limits their $J_e$.

Another issue with HTS wires and tapes is their slow quench propagation velocity which makes quench detection very difficult. It is essential to detect a quench early so as to avoid catastrophic failure of a HTS magnet. Detection of quench throughout the length of the wire used in a magnet would be very desirable.

Thus, it is desirable to provide a hybrid round superconductor wire, method for fabricating same, and method for detecting quench in same that are able to overcome the above disadvantages.

These and other advantages of the present invention will become more fully apparent from the detailed description of the invention herein below.

SUMMARY

Embodiments are directed to a round superconductor wire including a superconductor wire former and at least one superconductor tape wound on the superconductor wire former. Each superconductor tape includes: a substrate; a buffer film stack overlying the substrate; and a superconductor film overlying the buffer film stack.

Embodiments are also directed to a method for fabricating a round superconductor wire. The method includes: providing a superconductor wire former; and winding a superconductor tape around the superconductor wire former. The superconductor tape includes: a substrate; a buffer film stack overlying the substrate; and a superconductor film overlying the buffer film stack.

Embodiments are further directed to a method for detecting quench in a round superconductor wire. The method includes: employing the round superconductor wire in a coil configuration, wherein the round superconductor wire comprises a superconductor tape and a superconductor wire former on which the superconductor tape is wound; and monitoring current or voltage distribution between the superconductor tape and the superconductor wire former.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown in the figures.

DETAILED DESCRIPTION

It is to be understood that the figures and descriptions of the present invention may have been simplified to illustrate elements that are relevant for a clear understanding of the present embodiments, while eliminating, for purposes of clarity, other elements found in a typical round superconductor wire or typical method for fabricating a round superconductor wire. Those of ordinary skill in the art will recognize that other elements may be desirable and/or required in order to implement the present embodiments. However, because such elements are well known in the art, and because they do not facilitate a better understanding of the present embodiments, a discussion of such elements is not provided herein. It is also to be understood that the drawings included herewith only provide diagrammatic representations of the presently preferred structures of the present invention and that structures falling within the scope of the present embodiments may include structures different than those shown in the drawings. Reference will now be made to the drawings wherein like structures are provided with like reference designations.

Before explaining at least one embodiment in detail, it should be understood that the concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other embodiments of devices, systems, methods, features, and advantages described herein will be or become apparent to one with skill in the art upon examining the drawings and the detailed description herein. It's intended that all such additional devices, systems, methods, features, and advantages be protected by the accompanying claims.

For purposes of this disclosure, the terms "film" and "layer" may be used interchangeably.

For purposes of this disclosure, the phrase "round superconductor wire" may refer to a substantially round superconductor wire.

For purposes of this disclosure, the phrase "superconductor wire former" refers to a superconductor-containing wire former comprising, for example, a composite of a superconductor material and a (non-superconductor) metallic material or matrix.

For purposes of this disclosure, if the term "stabilizer" is mentioned generally (i.e., without the modifiers "bottom" or "top"), it may refer to either the bottom stabilizer or top stabilizer.

This disclosure describes round REBCO wires with improved engineering current density in high magnetic fields at, for example, liquid helium temperatures. STAR REBCO wires of diameters of 1.3 mm-2 mm (or smaller) have been fabricated using REBCO tapes wherein the REBCO film is positioned near the geometric center or near the neutral plane of the tape. Such STAR wires exhibit excellent tolerance to bend strain. Thus far, STAR wires have been fabricated with a former made entirely of copper. This description uses a superconducting/superconductor former for STAR wires, hence "hybrid STAR wires". Hybrid STAR wires lead to substantial improvement in $J_e$ and also serve as a mechanism for quench detection.

By replacement of the copper wire used as a former in STAR wires with a superconductor wire former, this disclosure seeks to improve the $J_e$ of STAR wires as well as provide a new method for quench detection. Using a, for example, Nb—Ti-containing superconductor wire former of approximately 1.1 mm or less (with a preferred diameter of 0.4-1.1 mm), STAR wires of diameters 1 to 3 mm have been fabricated by spiral winding of symmetric REBCO tapes over the superconductor wire former. Since Nb—Ti is superconducting below 10 T, its $J_e$ can add to the $J_e$ of the REBCO tapes resulting in a higher $J_e$ for the entire STAR wire. If $Nb_3Sn$ wire is used as a superconductor wire former, its $J_e$ could be additive to the STAR wire's $J_e$ even in fields up to 20 T. If $MgB_2$ or Bi—Sr—Ca—Cu—O (BSCCO) round wires are used as a former, their $J_e$ could be additive to the STAR wire's $J_e$ even in fields above 20 T.

Since the electromagnetic characteristics of REBCO tape is different from that of other superconductor wires, in the event of quench in a REBCO tape in a STAR wire, the distribution of current between the REBCO tape (i.e., the closest tape immediately adjacent the superconductor wire former) and the superconductor former could change. Such an abrupt change could be detected by monitoring any deviations in the voltage or current characteristics of the coil made with a STAR wire. This detection of an impending quench is desirable to shut down and protect the expensive magnet.

In aspects of the disclosure, engineering current density ($J_e$) levels of 400-1500 A/mm$^2$ at 4.2 K, 20 T may be achieved and which are up to about six-times higher than that achieved by $Nb_3Sn$ round superconductors at 4.2 K, 20 T.

In more detail, the inventors developed an innovative approach to fabricate round superconductor (e.g., REBCO) wires with high engineering current density and high tolerance to bending strain. These round superconductor wires may only be 1.6 to 2 mm in overall diameter and are made by winding narrow REBCO (rectangular) tapes on an approximately 1 mm diameter (or less) copper wire former. Such small diameter round superconductor wires are possible by the use of symmetric tapes where the REBCO film is positioned near the neutral plane of each wound tape. In other words, in each wound tape, the overall thickness of the combination of the various layers on either side of the centrally located REBCO film is substantial the same. Hence, the tapes are considered symmetric in this respect. Such a symmetric tape architecture is achieved by a strategic selection of the thickness of the top copper stabilizer to minimize the distance between the REBCO film and the neutral plane of the tape, which minimizes bending strains when the round wire is bent into small diameters. The substrate (e.g., Hastelloy, Inconel, Stainless Steel, Nichrome, Ni—W) itself is made thin, about 10-25 μm, so as to enable good tolerance to bending strain. The overall thickness of the REBCO tape is about 3060 μm including the copper stabilizer (see overall REBCO tape in FIG. 1A). A plurality of these REBCO tapes (e.g., six to eight in number), each about 2.5 mm in width, are wound on a copper wire former to yield a Symmetric Tape Round (STAR) wire. The copper wire former is strong in its axial direction while flexible enough for bending the STAR wire to a small diameter. STAR wires of this disclosure may be fabricated in lengths of, for example, 10 meters as shown in FIG. 2B.

Figure 1A:
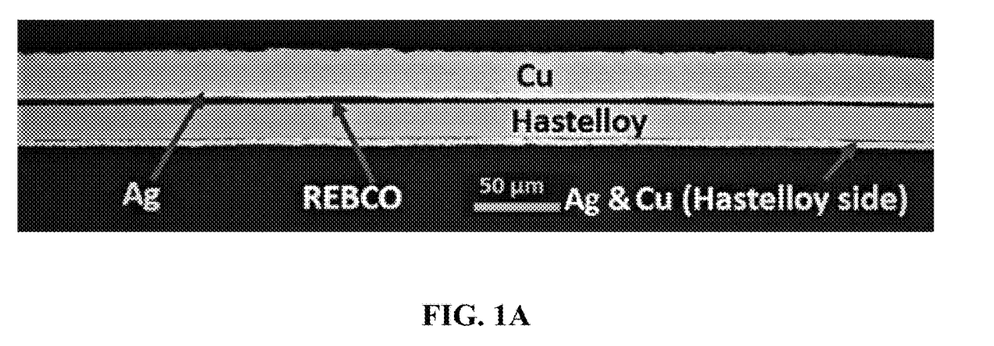
FIG. 1A is a schematic and cross-sectional diagram illustrating a thin symmetric REBCO tape (or REBCO-containing tape), wherein a REBCO film is positioned near the geometric center, close to the neutral plane. The overall tape thickness even with a 20+µm thick copper stabilizer is small because of the use of a thin (22 µm) Hastelloy substrate. The thin symmetric REBCO tape is one of a plurality of thin symmetric REBCO tapes used to make a round superconductor wire.

FIG. 1A, by way of example only, is a schematic and cross-sectional diagram illustrating a thin symmetric REBCO tape, wherein a REBCO film is positioned near the geometric center, close to the neutral plane. The overall tape thickness even with a 20+μm thick top copper stabilizer is small because of the use of a thin (22 μm) Hastelloy substrate. The thin symmetric REBCO tape is one of a plurality of thin symmetric REBCO tapes used to make a round superconductor wire.

Figure 1B:
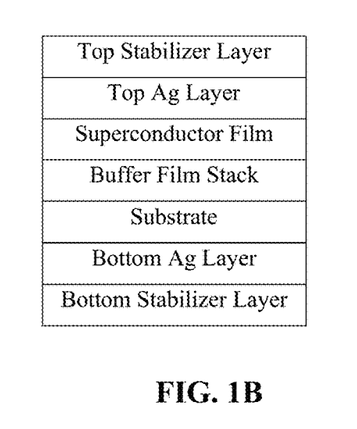
FIG. 1B is a schematic and cross-sectional diagram illustrating another one of a plurality of thin symmetric REBCO tapes used to make a round superconductor wire.

FIG. 1B is a schematic and cross-sectional diagram illustrating another one of a plurality of thin symmetric REBCO tapes used to make a round superconductor wire.

Figure 2A:
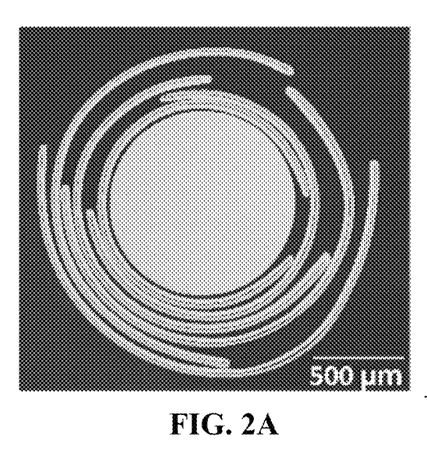
FIG. 2A is a cross-sectional view illustrating a Symmetric Tape Round (STAR) wire comprising a 1 mm diameter copper former and six symmetric REBCO tapes.
Figure 2B:
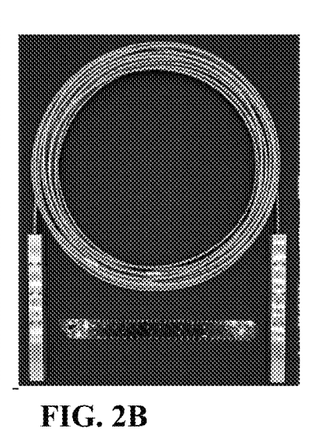
FIG. 2B is a plan view illustrating a 10 meter long, 1.9 mm diameter STAR wire.

FIG. 2A, by way of example only, is a cross-sectional view illustrating a Symmetric Tape Round (STAR) wire comprising a 1 mm diameter copper former and six symmetric REBCO tapes.

FIG. 2B, by way of example only, is a plan view illustrating a 10 meter long, 1.9 mm diameter STAR wire.

Figure 3:
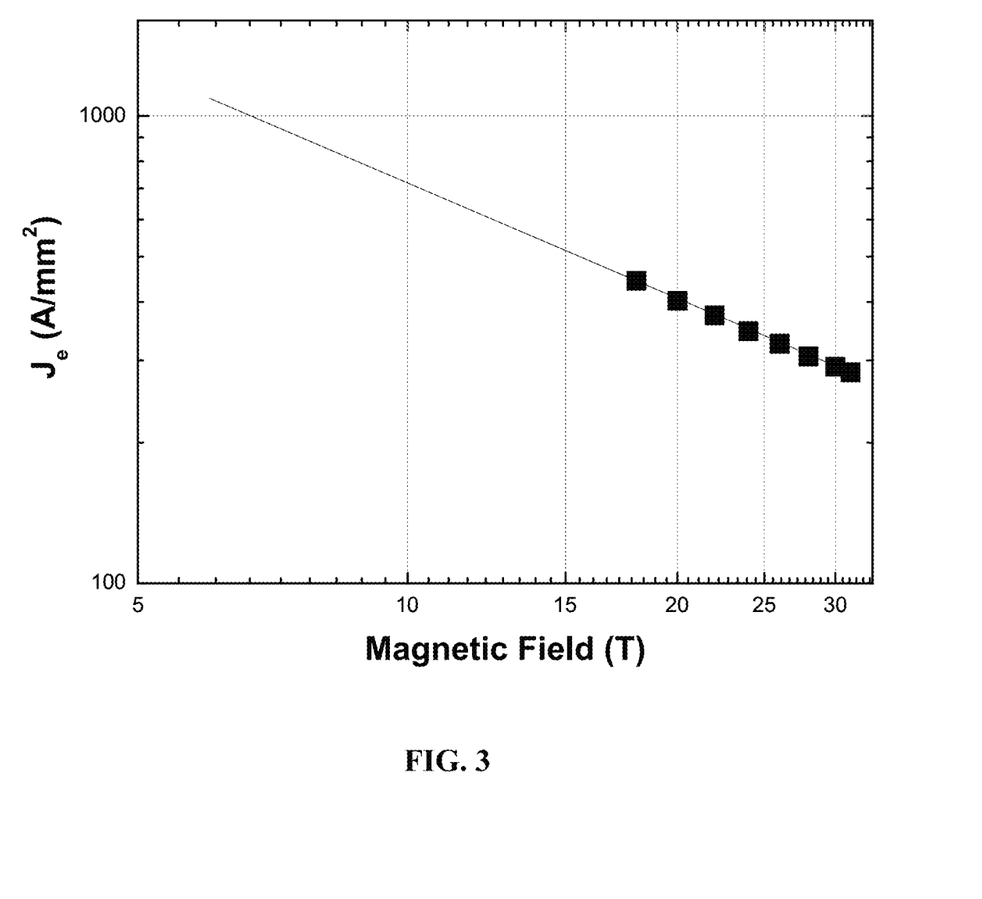
FIG. 3 is a plot illustrating $J_e$ of a 1.75 mm diameter STAR wire made with 8 symmetric REBCO tapes on a 0.81 mm diameter copper former, measured in high magnetic fields at 4.2 K when bent to a radius of 15 mm.

FIG. 3, by way of example only, is a plot illustrating $J_e$ of a 1.75 mm diameter STAR wire made with 8 symmetric REBCO tapes on a 0.81 mm diameter copper former, measured in high magnetic fields at 4.2 K when bent to a radius of 15 mm.

FIG. 3 shows the exemplary performance of a STAR wire in high magnetic fields at 4.2 K. This STAR wire was made by winding 8 layers of symmetric tape on a 0.81 mm diameter copper former. The first two layers were 2 mm wide tapes and the remainder six layers were 2.5 mm wide tapes. The overall diameter of the STAR wire was 1.75 mm. In a straight form, this wire exhibited a critical current of 571 A at 77 K, self-field, corresponding to an engineering current density of 238 A/mm². When bent to a radius of 15 mm, the critical current was 494 A at 77 K, self-field, corresponding to an engineering current density of 206 A/mm². At this bend radius, this wire exhibited a $J_e$ of 402 A/mm² at 20 T. Based on the alpha value of 0.82 in equation Eq. 1:

$$J_e(B)=J_e(0)B^{-\alpha} \quad \text{Eq. 1}$$

the $J_e$ at 15 T is projected to be 515 A/mm².

If round REBCO wires can be produced with excellent bend strain tolerance that can meet the stringent bend radius requirement of 15 mm and a $J_e$ at 4.2 K, 20 T of 600 A/mm² now and 1000 A/mm² or more in the near future, REBCO coils made of multiple wound round REBCO wires that enable future high-field accelerator magnets can be produced. A challenge in achieving such high $J_e$ levels is the degradation in the critical current of the round REBCO wires when made to small diameters of about 1-3 mm. This disclosure describes multiple embodiments to achieve high $J_e$ in round REBCO wires such as those with these small diameters.

Conventional round REBCO wires are made with nearly identical REBCO tapes wound in a spiral fashion over a round former. Each round REBCO wire may comprise REBCO tapes of the same or, alternatively, different structural dimensions and/or composition in the different layers of the multiple superconductor tapes. The REBCO tapes of this disclosure are spirally wound over a round superconductor former. A (e.g., steady) change in the structure of the REBCO tapes from the inner REBCO tape to the outer REBCO tape of a round REBCO-containing wire may be employed. Some layers/structures within a REBCO tape may not change from corresponding layers/structures in the previous underlying REBCO tape (e.g., in any of the embodiments below). The following different structures of REBCO tapes are disclosed:

a. Thickness of copper stabilizer on the REBCO film side.

b. Thickness of silver layer(s).

c. Thickness of substrate.

d. Thickness of REBCO film.

e. Width of REBCO tape.

Exemplary Embodiments

By replacement of the copper wire used as a former in STAR wires with a superconducting wire former, this disclosure seeks to improve the $J_e$ of STAR wires as well as provide a new method for quench detection. Using a Nb—Ti-containing superconductor wire former of 0.4-1.1 mm diameter, hybrid STAR wires of diameters 1 to 3 mm may be fabricated by spiral winding of symmetric REBCO tapes over the superconductor wire former. Since Nb—Ti is superconducting below 10 T, its $J_e$ can add to the $J_e$ of the REBCO tapes resulting in a higher $J_e$ for the entire STAR wire. Similarly, if a Nb₃Sn-containing superconductor wire former is used, its $J_e$ could be additive to the STAR wire's $J_e$ even in fields up to 20 T. Alternatively, if either a MgB2-containing or Bi—Sr—Ca—Cu—O (BSCCO)-containing superconductor wire former is used, either former's $J_e$ could be additive to the STAR wire's $J_e$ even in fields above 20 T.

Since the electromagnetic characteristics of REBCO tape is different from that of other superconductor wires, in the event of quench in a REBCO tape in a STAR wire, the distribution of current or voltage between the REBCO tape and the superconductor wire former could change. Such an abrupt change could be detected by monitoring any deviations in the current or voltage characteristics of the coil made with a STAR wire. This detection of an impending quench is desirable to shut down and protect the expensive magnet.

Figure 4:
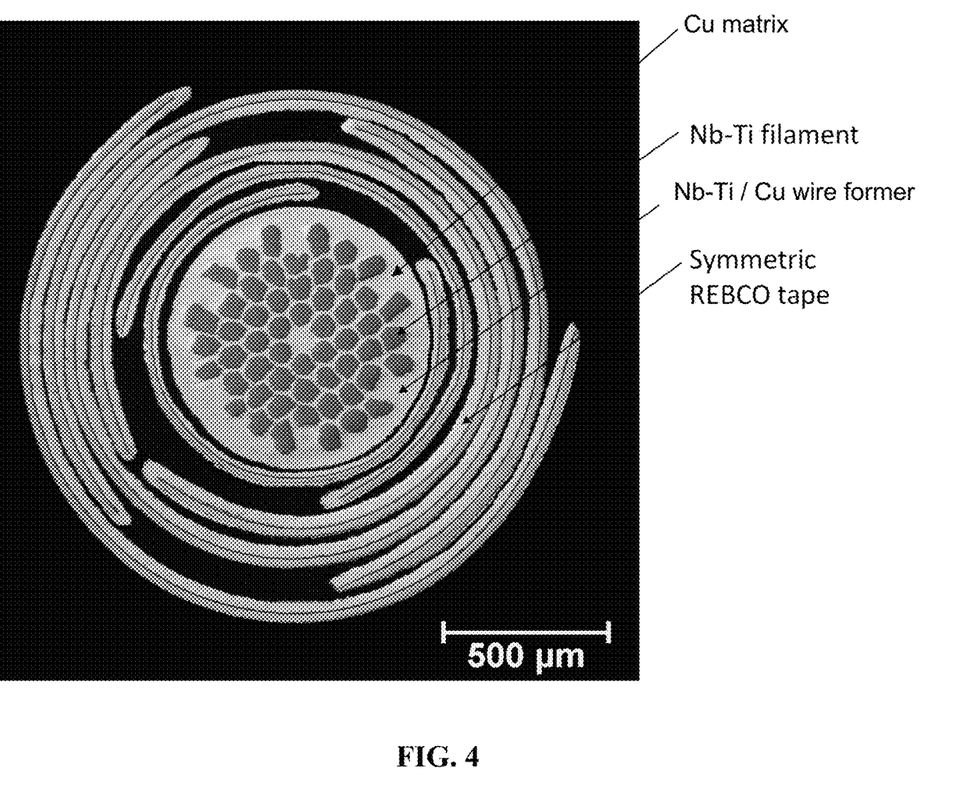
FIG. 4 is a cross-sectional view illustrating a hybrid STAR wire comprising a 0.79 mm diameter Nb—Ti-containing former and six layers of symmetric REBCO tapes.

FIG. 4, by way of example only, is a cross-sectional view illustrating a hybrid STAR wire comprising a 0.79 mm diameter Nb—Ti-containing former and six layers of symmetric REBCO tapes. More specifically, FIG. 4 displays a cross-section of a STAR wire made using a 0.79 mm diameter Nb—Ti/Cu superconducting wire former. The Nb—Ti composition is in the form of filaments, with the Nb—Ti/Cu wire former being a composite of copper matrix with embedded Nb—Ti filaments. The Nb—Ti to Cu ratio in the Nb—Ti/Cu wire former is 1:1.25. Also shown in FIG. 4 are six symmetric REBCO tapes wound on the Nb—Ti/Cu wire former to an overall STAR wire diameter of 1.54 mm.

Table 1 shows details of four hybrid STAR wires made with varying numbers of symmetric REBCO tapes wound on a 0.79 mm diameter Nb—Ti/Cu superconductor wire. For example, hybrid-STAR wire #4 is made with two 1.8 mm, four 2.5 mm, and two 2.6 mm wide symmetric REBCO tapes and exhibited a critical current $I_c$ greater than 600 A at 77 K, self-field when bent to a radius of 15 mm. This value corresponds to a $J_e$ greater than 274 A/mm².

TABLE 1

Details of four hybrid STAR wires fabricated with a 0.79 mm diameter Nb—Ti/Cu superconductor wire former. Critical current measurements were conducted at a bend radius of 15 mm.

| H-STAR # | Tape width in each layer | Total # of tapes | Final STAR wire diameter (mm) | $I_c$ (A) at 77 K, self-field | $J_e$ (A/mm$^2$) at 77 K, self-field |
|---|---|---|---|---|---|
| 1 | 1.8 mm × 2, 2.5 mm × 1 | 3 | 1.20 | 185 | 164 |
| 2 | 1.8 mm × 2, 2.5 mm × 2 | 4 | 1.30 | 262 | 198 |
| 3 | 1.8 mm × 2, 2.5 mm × 4 | 6 | 1.54 | 466 | 250 |
| 4 | 1.8 mm × 2, 2.5 mm × 4, 2.6 mm × 2 | 8 | 1.67 | >600 | >274 |

Figure 7:
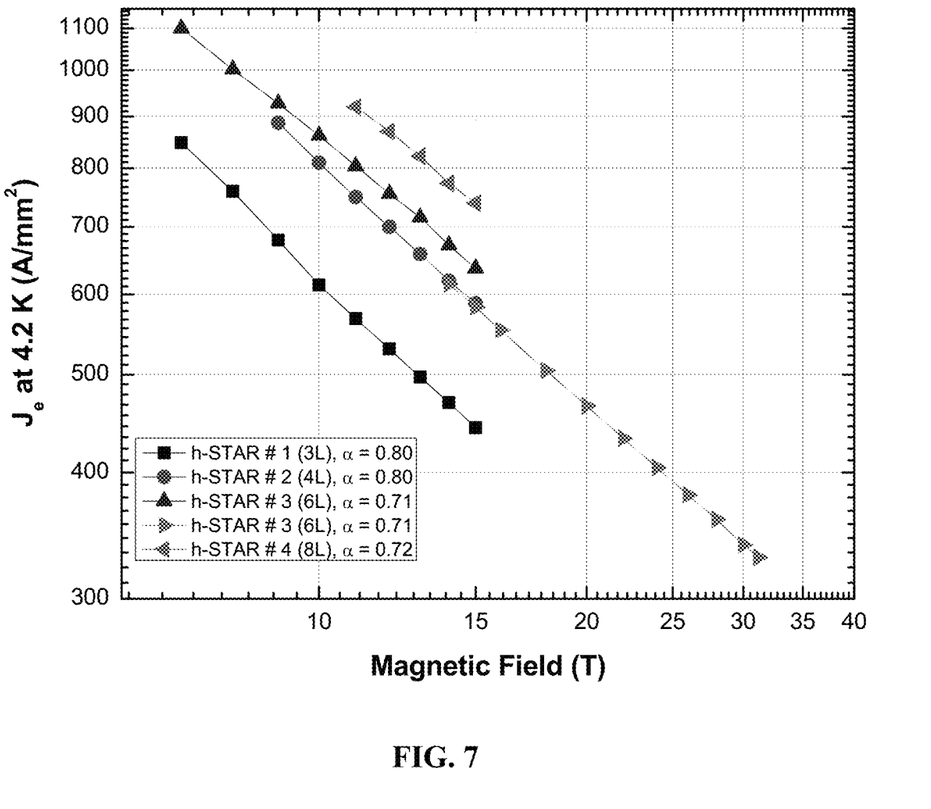
FIG. 7 is a plot illustrating magnetic field dependence of engineering current density of four hybrid STAR wires at 4.2 K, measured at a bend radius of 15 mm.

The engineering current densities of the four hybrid STAR wires at 4.2 K in magnetic fields up to 31.2 T are shown in FIG. 7, measured when bent to a radius of 15 mm. Four STAR wires were contemplated. STAR wire #3 was tested at two different times—one up to 15 T and another from 14 to 31 T. "L" refers to the number of layers of tapes wound on the superconductor wire former. In this case, "L" is equal to the number of tapes shown in Table 1. "α" is the variable in the exponent shown in the equation (Eq. 1) above.

As shown in FIG. 7, hybrid STAR wire #4 has the most number of layers and exhibits the highest $J_e$ value of 739 A/mm$^2$ at 4.2 K, 15 T. This value compares with a $J_e$ of 515 A/mm$^2$ of the STAR wire (having a copper wire former) whose plot is shown in FIG. 3. This STAR wire has a similar former diameter and overall diameter and the same number of REBCO tapes as hybrid STAR wire #4. Based on the alpha value for hybrid STAR wire #4, it is projected that its $J_e$ will reach 600 A/mm$^2$ at 4.2 K, 20 T which compares with the measured value of 402 A/mm$^2$ at 20 T of the STAR wire plot shown in FIG. 3.

The Nb—Ti/Cu superconductor wire former will be superconducting at 4.2 K in magnetic fields below 10 T. Therefore, it could potentially sustain some current in magnetic fields less than 10 T which would raise the overall $J_e$. The slight upward deviation in the slope of the $J_e$ (B (magnetic field)) plot of hybrid STAR wire #1 in magnetic fields below 10 T could be indicative of such current sharing between the REBCO tapes and the Nb—Ti/Cu superconductor wire former. Such current sharing is not feasible with a copper wire former because of its low current-carrying capability.

In addition to increasing the $J_e$ of STAR wires, the superconductor wire former has a potential to detect a quench event. Quench occurs when there is a sudden transition from superconducting state to a resistive state. In such a drastic transition, the enormous current flowing through the superconductor has to be halted to avoid a catastrophic damage to the superconducting coil or magnet. Quench propagation velocity of REBCO is notoriously low which makes it hard to detect a quench in time by conventional methods. In the scenario of current sharing between the REBCO tapes and the superconductor wire former, when quench occurs in the REBCO tapes, a redistribution of the current sharing could be detected by measuring the voltage or current across the coil. This redistribution of current could then be used as a method to detect quench and protect the coil/magnet.

While examples given in this invention are based on Nb—Ti as the superconducting composition within the superconductor wire former for the hybrid STAR wire, the invention is applicable to superconductor wire formers comprising other superconductor compositions of a predominantly round geometry such as Nb$_3$Sn, MgB$_2$, Bi—Sr—Ca—Cu—O, and combinations thereof. In these cases, the current sharing between the REBCO tapes and superconductor wire former could extend to magnetic fields of 20 T and above.

Embodiments are directed to a round superconductor wire including a superconductor wire former and at least one superconductor tape wound on the superconductor wire former. Each superconductor tape includes: a substrate; a buffer film stack overlying the substrate; and a superconductor film overlying the buffer film stack. In an embodiment, the superconductor wire former comprises a composition selected from the group consisting of Nb—Ti, Nb$_3$Sn, MgB$_2$, Bi—Sr—Ca—Cu—O, and combinations thereof. In another embodiment, the superconductor wire former comprises a plurality of superconductor filaments. In another embodiment, the superconductor wire former comprises a composite comprising a plurality of superconductor filaments embedded within a non-superconducting metal matrix. In another embodiment, the superconductor wire former comprises a composite comprising a plurality of Nb—Ti filaments embedded within a copper matrix. In yet another embodiment, the at least one superconductor tape comprises at least two superconductor tapes. In a further embodiment, the round superconductor wire comprises a diameter of 1-3 mm, and the superconductor wire former comprises a diameter of 0.4-1.1 mm.

Figure 5:
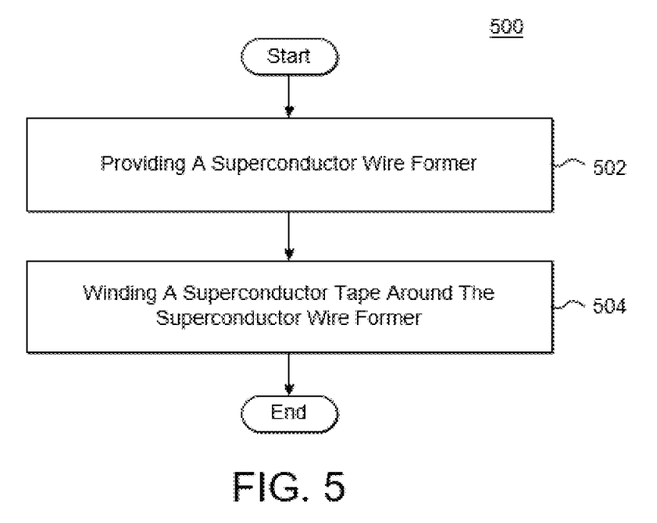
FIG. 5 is a flowchart illustrating an embodiment of a method for fabricating a round superconductor wire, in accordance with an embodiment.

By way of example only, FIG. 5 is a flowchart illustrating an embodiment of a method 500 for fabricating a round superconductor wire. In an embodiment, the method 500 includes: providing a superconductor wire former (block 502); and winding a superconductor tape around the superconductor wire former (block 504). The superconductor tape includes: a substrate; a buffer film stack overlying the substrate; and a superconductor film overlying the buffer film stack. In an embodiment of the method, the superconductor wire former comprises a composition selected from the group consisting of Nb—Ti, Nb$_3$Sn, MgB$_2$, Bi—Sr—Ca—Cu—O, and combinations thereof. In another embodiment of the method, the superconductor wire former comprises a plurality of superconductor filaments. In another embodiment of the method, the superconductor wire former comprises a composite comprising a plurality of superconductor filaments embedded within a non-superconducting metal matrix. In another embodiment of the method, the superconductor wire former comprises a composite comprising a plurality of Nb—Ti filaments embedded within a copper matrix. In yet another embodiment of the method, the superconductor tape is a first superconductor tape, the method further includes winding a second superconductor tape around the first superconductor tape. The second superconductor tape includes: a substrate; a buffer film stack overlying the substrate; and a superconductor film overlying the buffer film stack. This winding of a second superconductor tape around the first superconductor tape covers the situation where the second superconductor tape may or may not be in direct contact with the first superconductor tape. For example, other superconductor tapes may be between the first and second superconductor tapes. In a further embodiment of the method, the round superconductor wire comprises a diameter of 1-3 mm, and the superconductor wire former comprises a diameter of 0.4-1.1 mm.

Figure 6:
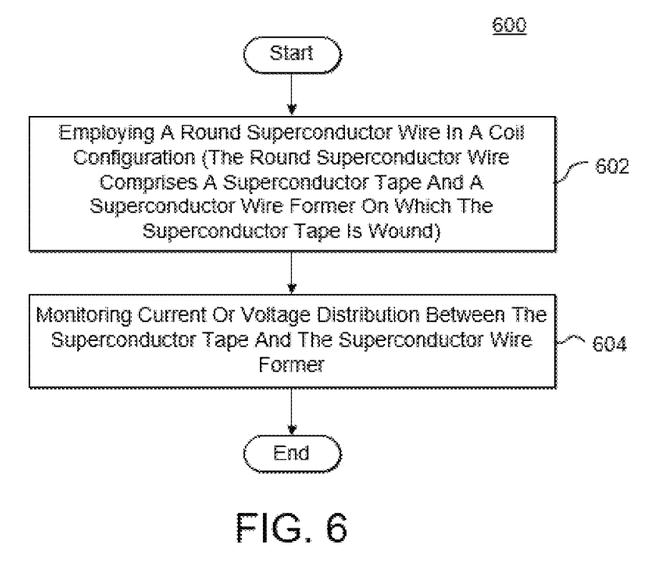
FIG. 6 is a flowchart illustrating an embodiment of a method for detecting quench in a round superconductor wire, in accordance with an embodiment.

By way of example only, FIG. 6 is a flowchart illustrating an embodiment of a method 600 for detecting quench in a round superconductor wire. In an embodiment, the method 600 includes: employing the round superconductor wire in a coil configuration, wherein the round superconductor wire includes a superconductor tape and a superconductor wire former on which the superconductor tape is wound (block 602); and monitoring current or voltage distribution between the superconductor tape and the superconductor wire former (block 604). In an embodiment of the method for detecting quench, the superconductor wire former comprises a composition selected from the group consisting of Nb—Ti, $Nb_3Sn$, $MgB_2$, Bi—Sr—Ca—Cu—O, and combinations thereof. In another embodiment of the method for detecting quench, the superconductor wire former comprises a plurality of superconductor filaments. In another embodiment of the method for detecting quench, the superconductor wire former comprises a composite comprising a plurality of superconductor filaments embedded within a non-superconducting metal matrix. In yet another embodiment of the method for detecting quench, the superconductor wire former comprises a composite comprising a plurality of Nb—Ti filaments embedded within a copper matrix. In a further embodiment of the method for detecting quench, the round superconductor wire comprises a diameter of 1-3 mm, and the superconductor wire former comprises a diameter of 0.4-1.1 mm.

Although embodiments are described above with reference to REBCO tapes comprising REBCO superconductor films, the REBCO superconductor films described in any of the above embodiments may alternatively be superconductor films comprising different superconductor material(s). Such alternative is considered to be within the spirit and scope of the present invention, and may therefore utilize the advantages of the configurations and embodiments described above.

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described above may be employed in combination with features in other embodiments described above, such combinations are considered to be within the spirit and scope of the present invention.

The contemplated modifications and variations specifically mentioned above are considered to be within the spirit and scope of the present invention.

It's understood that the above description is intended to be illustrative, and not restrictive. The material has been presented to enable any person skilled in the art to make and use the concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the embodiments herein therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A round superconductor wire comprising:
   a superconductor wire former; and
   at least one superconductor tape wound on the superconductor wire former, each superconductor tape comprising:
   a substrate;
   a buffer film stack overlying the substrate; and
   a superconductor film overlying the buffer film stack,
   wherein the superconducting wire has an engineering current density ($J_e$) of 400-1500 A/mm$^2$ at 4.2 K, 20 T.

2. The round superconductor wire of claim 1, wherein the superconductor wire former comprises a composition selected from a group consisting of Nb—Ti, Nb3Sn, MgB2, Bi—Sr—Ca—Cu—O, and combinations thereof.

3. The round superconductor wire of claim 1, wherein the superconductor wire former comprises a plurality of superconductor filaments.

4. The round superconductor wire of claim 1, wherein the superconductor wire former comprises a composite comprising a plurality of superconductor filaments embedded within a non-superconducting metal matrix.

5. The round superconductor wire of claim 1, wherein the superconductor wire former comprises a composite comprising a plurality of Nb—Ti filaments embedded within a copper matrix.

6. The round superconductor wire of claim 1, wherein the at least one superconductor tape comprises at least two superconductor tapes.

7. The round superconductor wire of claim 1, wherein the round superconductor wire comprises a diameter of 1-3 mm, and the superconductor wire former comprises a diameter of 0.4-1.1 mm.

8. A method for fabricating a round superconductor wire, the method comprising:
   providing a superconductor wire former; and
   winding a superconductor tape around the superconductor wire former;
   wherein the superconductor tape comprises:
   a substrate;
   a buffer film stack overlying the substrate; and
   a superconductor film overlying the buffer film stack,
   wherein the superconducting wire has an engineering current density ($J_e$) of 400-1500 A/mm$^2$ at 4.2 K, 20 T.

9. The method of claim 8, wherein the superconductor wire former comprises a composition selected from a group consisting of Nb—Ti, Nb3Sn, MgB2, Bi—Sr—Ca—Cu—O, and combinations thereof.

10. The method of claim 8, wherein the superconductor wire former comprises a plurality of superconductor filaments.

11. The method of claim 8, wherein the superconductor wire former comprises a composite comprising a plurality of superconductor filaments embedded within a non-superconducting metal matrix.

12. The method of claim 8, wherein the superconductor wire former comprises a composite comprising a plurality of Nb—Ti filaments embedded within a copper matrix.

13. The method of claim 8, wherein the superconductor tape is a first superconductor tape, the method further comprises:
   winding a second superconductor tape around the first superconductor tape;
   wherein the second superconductor tape comprises:
   a substrate;
   a buffer film stack overlying the substrate; and
   a superconductor film overlying the buffer film stack.

14. The method of claim 8, wherein the round superconductor wire comprises a diameter of 1-3 mm, and the superconductor wire former comprises a diameter of 0.4-1.1 mm.

15. A method for detecting quench in a round superconductor wire, the method comprising:
    employing the round superconductor wire in a coil configuration, wherein the round superconductor wire comprises a superconductor tape and a superconductor wire former on which the superconductor tape is wound; and
    monitoring current or voltage distribution between the superconductor tape and the superconductor wire former.

16. The method of claim 15, wherein the superconductor wire former comprises a composition selected from a group consisting of Nb—Ti, Nb3Sn, MgB2, Bi—Sr—Ca—Cu—O, and combinations thereof.

17. The method of claim 15, wherein the superconductor wire former comprises a plurality of superconductor filaments.

18. The method of claim 15, wherein the superconductor wire former comprises a composite comprising a plurality of superconductor filaments embedded within a nonsuperconducting metal matrix.

19. The method of claim 15, wherein the superconductor wire former comprises a composite comprising a plurality of Nb—Ti filaments embedded within a copper matrix.

20. The method of claim 15, wherein the round superconductor wire comprises a diameter of 1-3 mm, and the superconductor wire former comprises a diameter of 0.4-1.1 mm.

* * * * *